T. CULLEN.
Dovetailing Machines.

No. 137,830. Patented April 15, 1873.

Witnesses: Inventor:
A. Benjreinendorf. T. Cullen
C. Sedgwick. per
 Attorneys.

3 Sheets--Sheet 2.

T. CULLEN.
Dovetailing Machines.

No. 137,830. Patented April 15, 1873.

Witnesses:
A. Benneckendorf.
C. Sedgwick.

Inventor:
T. Cullen
PER
Attorneys.

3 Sheets--Sheet 3.

T. CULLEN.
Dovetailing Machines.

No. 137,830. Patented April 15, 1873.

Witnesses:
A. Benneckendorf.
C. Sedgwick

Inventor:
T. Cullen
per Munn & Co.
Attorneys.

UNITED STATES PATENT OFFICE.

THOMAS CULLEN, OF BLACKSTONE, MASSACHUSETTS.

IMPROVEMENT IN DOVETAILING-MACHINES.

Specification forming part of Letters Patent No. 137,830, dated April 15, 1873; application filed February 8, 1873.

*To all whom it may concern:*

Be it known that I, THOMAS CULLEN, of Blackstone, in the county of Worcester and State of Massachusetts, have invented an Improvement in Dovetailing-Machines, of which the following is a specification:

The invention consists in the improvement of dovetailing-machines, as hereinafter fully described and pointed out in the claims.

Figure 1:
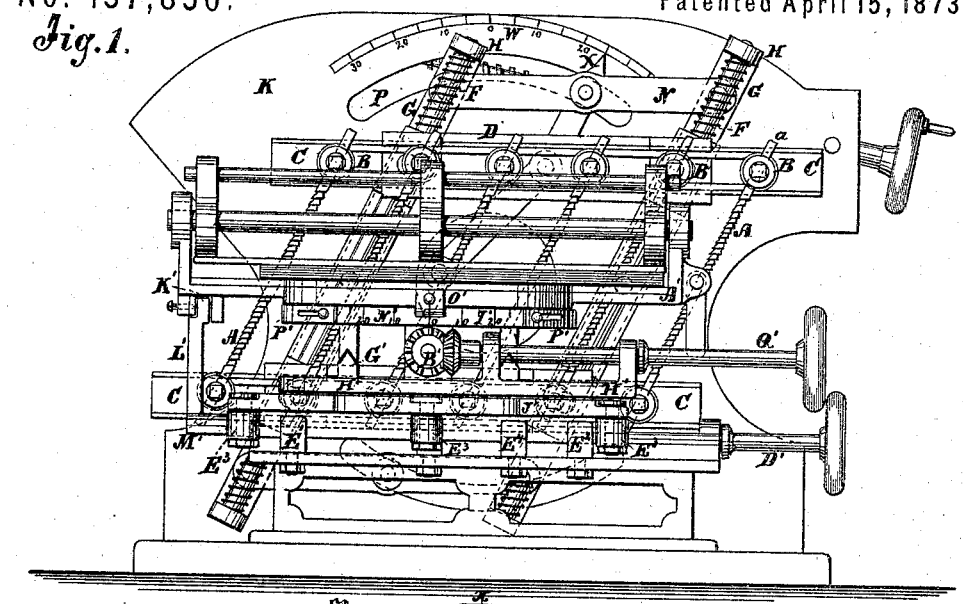
Figure 2:
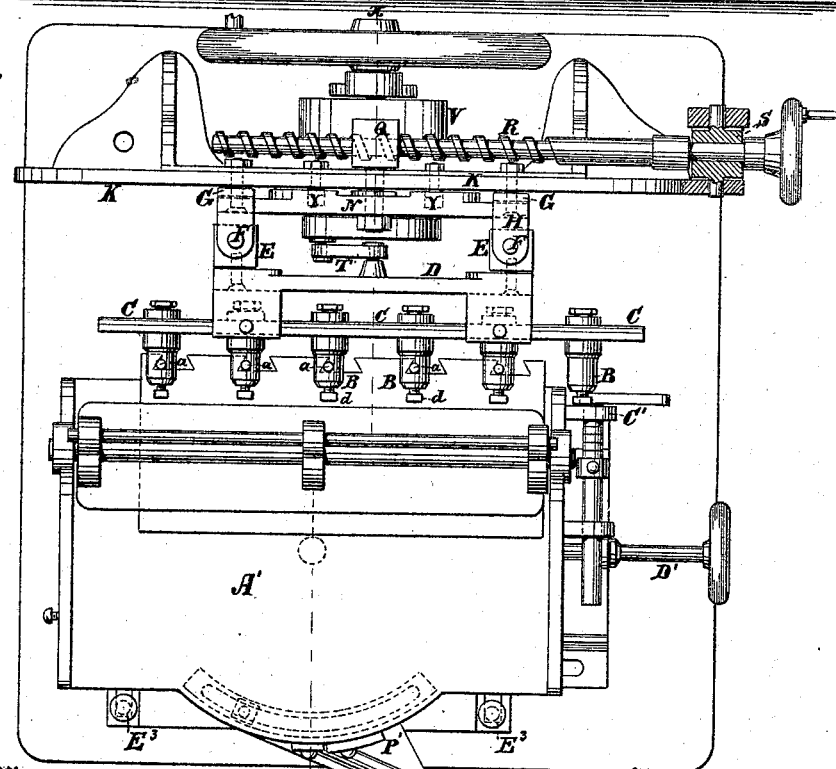
Figure 3:
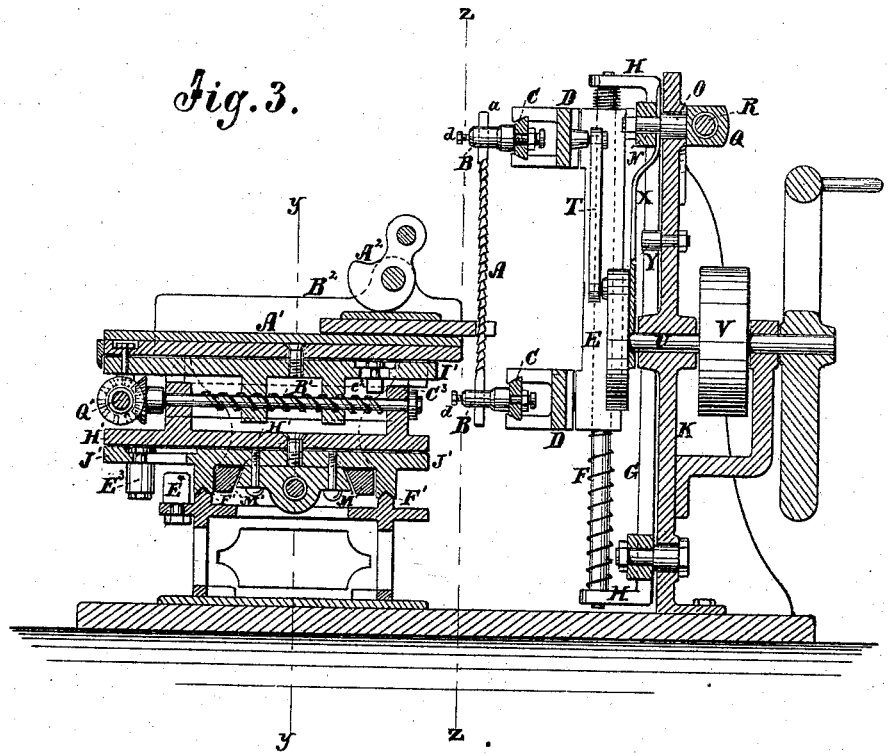
Figure 4:
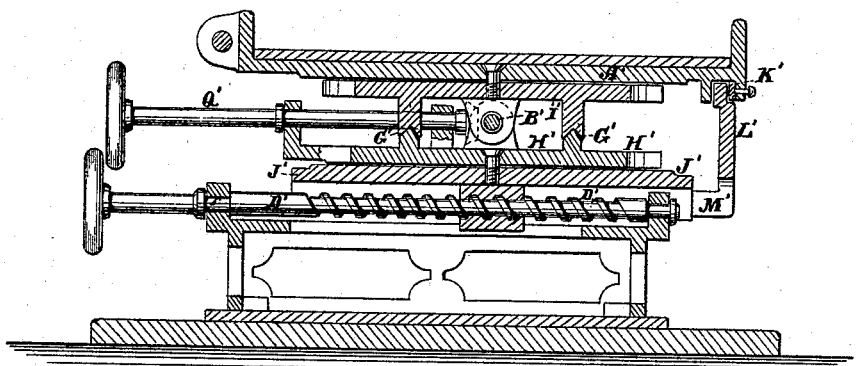
Figure 5:
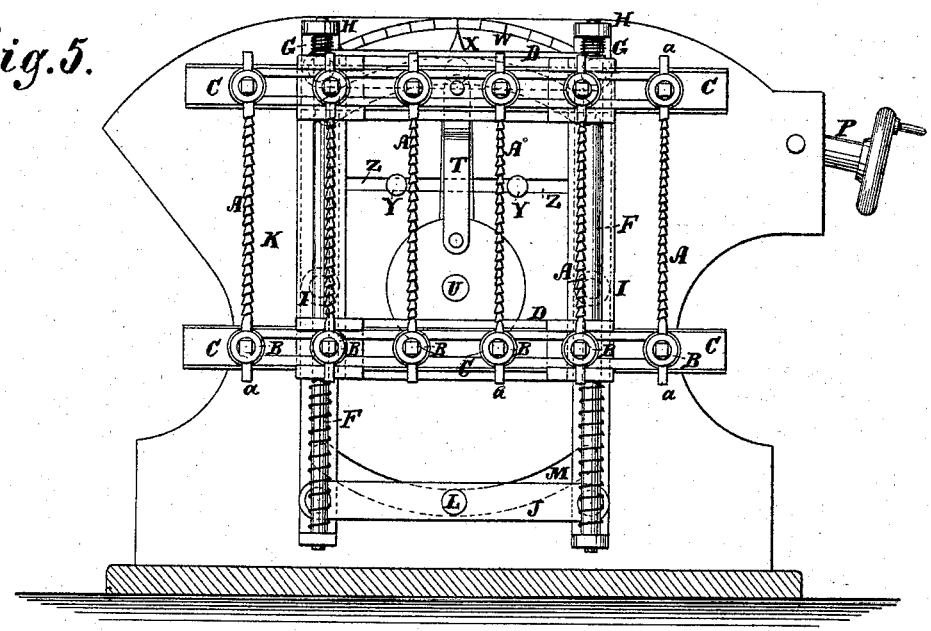
Figure 6:
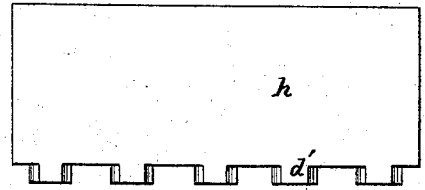
Figure 7:
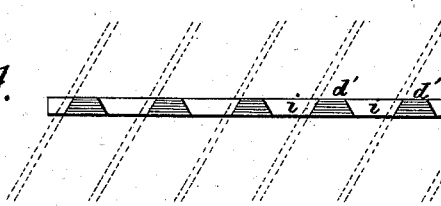
Figure 8:
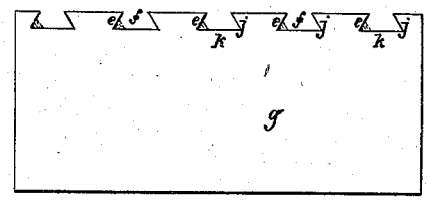

Figure 1 is a front elevation of my improved machine. Fig. 2 is a plan view with a part sectioned horizontally. Fig. 3 is a sectional elevation taken on the line $x\ x$ of Fig. 2. Fig. 4 is a sectional elevation taken on the line $y\ y$ of Fig. 3. Fig. 5 is a section taken on the $z\ z$ of Fig. 3. Fig. 6 is a plan view of a piece of work with beveled tenons, such as formed with the machine. Fig. 7 is an end elevation of Fig. 6, with the saws indicated in dotted lines as they work in beveling the edges of the tenons; and Fig. 8 is a plan view, with a piece of work with dovetail-notches as formed by the machine.

Similar letters of reference indicate corresponding parts.

A represents the saws, which are triangular in cross-section, with teeth formed on each side, and consequently on the corners, too. They are preferably formed of round steel rods, hammered into three-sided shape in the part to be toothed, leaving round shanks $a$ at the ends for connecting the saws to the gates by means of studs B; but they may be formed of triangular bars and have the shanks rounded to fit in the studs. The object of fitting them in holes through the studs and fastening them by binding-screws $d$, as shown in the drawing, is to be able to turn them on their longitudinal axes to adjust them to the work properly, it being important to have the faces fronting the work exactly parallel with the end thereof in which the notches are to be cut in order to cut them square with the work at the bottom. The studs B are swiveled in the long slotted bars C, which are mounted in the cross-bars D of the saw-gate, which are pivoted to the sliding bars E on the guide-rods F, and these guide-rods are mounted on the bars G, with which they are parallel, and which have angle-pieces H at the ends, in which the rods are fitted, and these bars G are pivoted at the center I to the strong vertical face-plate K, so as to swing around on the face of the said plate for adjusting the saws for vertical or oblique work. They are also connected at the lower ends by the bar J, which is jointed to them so that they can oscillate on the joints as necessary to allow the saws to swing. This bar has a guide-pin, L, sliding in the curved slot M in plate K to control the gate at the lower end. At the upper end the gate-bars G are connected by another cross-bar, N, which also has a guide-pin, O, working in a curved slot, P, in the plate K, and this pin has a large head, Q, behind the face-plate, through which an adjusting-screw, R, screws for adjusting the saws. This screw has only one bearing, S, which is journaled in the frame so as to oscillate to allow the head Q to traverse the curved way P, and it is provided with a hand-crank for turning it. The upper cross-bar D of the saw-gate is connected by a rod, T, with the crank-shaft U, by which the saws are worked, the said shaft being arranged at the center around which the saw-gate oscillates in adjusting the saws for working obliquely, and provided with a driving-pulley, V, behind the face-plate. A scale, W, is arranged on the upper part of the face-plate, and an index-finger, X, is arranged on the saw-gate to sweep it and indicate the degree of the inclination of the saws. Adjustable stops Y are arranged in the slot Z, to arrest the saw-gate at the right points in shifting it forward and back in sawing tenons, the said stops being set by the scale and index at the top, so that the changes, which in this kind of work are of necessity frequent, can be made without reference to the scale. The adjusting-screw holds the gate in position after it is adjusted. The studs B by which the saws are held are swiveled, to allow them to turn as is necessary for the shifting of the saw-gate, and they are connected to slotted bars C, so that they can be shifted more or less distant from each other, according to the distances the notches are to be apart, which vary considerably in the different kinds of work. This adjustment of the saw-gate for inclining the saws to the right and left of the vertical line is only required for forming the bevel edges of the tenons $d'$, in which case the saws will be adjusted, say to the right, as in Fig. 7, to the same inclination from the vertical line as the bevel of the lines $e$ of the dovetail-notches $f$ with the longitudinal axis of the board $g$, and being operated in that inclination, the board $h$ will be fed up to them in the line of its longitudinal axis a distance equal to the thickness of the board $g$ on the table $A^1$, by means of the feed-screw $B^1$, the distance being determined by a stop, $C^2$, on the under side of casing $I'$, previously adjusted, therefore, relatively to the lug $C^3$, then the saws will be shifted over to the opposite inclination, and at the same time the board will be fed at right angles to the direction of the previous feeding-movement by the screw $D^1$, to cut the bottoms of the notches $i$, the length of which is governed by another stop, say $E^1$, Fig. 1; then the board $h$ is fed directly back again by the screw $B'$, and the other bevel edge is formed, and then the table is fed back by screw $D^1$ till arrested by stop $E^2$, to be ready for the next operation.

For cutting the dovetail-notches $f$ in the board $g$, the saws are only used in the vertical position, and the board is fed to and from the saws obliquely, to form the sides $e$ and $j$; but for cutting the bottom sides $k$, it is fed in the same manner by the screw $D^1$ as the board $h$ is for cutting its notches $i$ at the bottom.

For the direct feed for cutting the bevel edges of the tenons, and the cross or transverse feed for cutting the bottom of the notches, merely two ordinary sets of ways, $F'$ and $G'$, at right angles to each other, with corresponding feed-screws $D^1$ $B^1$, and carriages $J'$ and $I'$, are needed; but for the oblique feed for the sides of the dovetail-notches $f$, the plate $H'$, which carries the ways $G'$, on which the work feeds to and from the saws, and the carriage $I'$, which works on said ways and carries the feed-table $A^1$, are pivoted, respectively, to the carriage $J'$, which slides on the ways $F$ and the table $A^1$, so that the ways $G'$ can be shifted around obliquely to the plane of the gang of saws; also to the ways $H'$, to correspond with the bevels $e$ $j$, so that the work can be fed accordingly; but to prevent the table $A^1$ from turning with the carriage $I'$ and cause it to keep the work square to the saws, it is connected at one side by the groove $K'$ with the plate $L'$, which has bars $M'$, fitted under the carriage $J'$, so as to be supported by it, and so that they can slide a little on it each way. This plate $L'$ prevents the work-table from turning, and it slides forward and back slightly in its ways under carriage $J'$, when the work-table moves obliquely, and consequently changes in that direction to some extent. A scale, $N'$, is provided on the front edge of this shifting-carriage, and an index, $O'$, on the work-table to gage the oblique adjustment of the ways $G'$ to correspond with the bevel of the tenons, and adjustable stops $P'$ are fixed on the carriage $I'$ to stop it without regard to the scale after being set by the scale. The adjustable stops $E^1$, $E^2$, and $E^3$ on the frame, and the adjustable stop-pins $E^4$ on the carriage $J'$, are used to regulate the lateral movements of the work by the screw $D^2$ to cut the bottoms of the notches.

The stop-pins $E^4$ may be shifted right or left, as shown in Fig. 3, to strike the stops or not, as desired, and the stops can be shifted the other way to limit the movements of the carriage.

The two middle stops $E^3$ and the middle stop-pin $E^4$ will be used for cutting the boards $g$, and the two outer stops $E^1$ and $E^2$; also the two outer stop-pins $E^3$, will be used for cutting the boards $h$; so that to shift for either only requires the shifting of the middle stop-pin inward and the other two outward, or vice versa. The feed-screw $B^1$ is geared with the shaft $Q'$, which ranges parallel, or nearly so, with the shaft of feed-screw $D^1$, and they both range with the adjusting-screw $R$, so that all can be conveniently manipulated by the attendant at the right-hand side of the machine, as represented in Fig. 2.

The shifting of the carriage I for the bevel sides of the notches $f$ is effected by the shaft $Q'$. The position of said shaft in Fig. 2 indicates the ways $G'$ and the carriage $I'$ to be in the position for feeding the board up to the saws for cutting the bevel sides $e$ of notches $f$, for which the shaft will be turned by hand to screw the feed-table forward until it is arrested by the stop $C^2$ coming against lug $C^3$; then the feed-screw $D^1$ will be turned to slide the work to the left by the carriage $J'$ to cut the bottoms $K$ of the notches, and during this time the shaft $Q'$ will be thrown around to the right to shift the ways $G'$ around to correspond with the sides $j$ of said notches, ready to feed the work back from the saws and from said sides as soon as the limit of the transverse movement for cutting the bottoms is reached and the movement stopped by one of the stop middle pins $E^4$ and a stop, $E^1$ or $E^2$; then the board is taken out and the other end presented to the saws, and the work continued by feeding it up to cut the sides $j$ first, and back to cut the sides $e$ last, and next the sides $e$ will be cut first and $j$ last, and so on.

The boards to be notched are clamped on the table $A^1$ by eccentric clamps $A^2$ being placed at one edge against one of the side pieces $B^2$ to be squared to the saws. The stop $C^1$ is used to gage the adjustment of the boards beyond the table, according to the required depth of the notches.

Having thus described my invention, I claim as new and desire to secure by Letters Patent—

1. The combination, with the feeding-carriage $J'$ and table $A^1$, of ways $G^1$, arranged to feed the work longitudinally and obliquely, in the manner described.

2. The combination of the stops $E^1$ $E^2$ and stop-pins $E^4$ with the carriage $J'$, when arranged substantially as specified.

3. The combination of the bars C D E G J N and the rods F, in the manner described.

4. The saws connected to the slotted bars C by the swiveled studs B, substantially as specified.

5. The combination of the stops Y, bars G, cross-bar N, pin O Q, face-plate K, and adjusting-screw R.

6. The combination of the plate L' and bars M' with the work-table, the oscillating carriage I', and the carriage J', substantially as specified.

THOMAS CULLEN.

Witnesses:
A. P. THAYER,
ALEX. F. ROBERTS.